US011912060B1

(12) United States Patent
Dawson et al.

(10) Patent No.: US 11,912,060 B1
(45) Date of Patent: Feb. 27, 2024

(54) METHOD OF PRODUCING DECORATIVE ARTICLES USING SNAP FASTENERS

(71) Applicants: Dony Dawson, Keller, TX (US); Stephen Hilton Savoie, Arlington, TX (US)

(72) Inventors: Dony Dawson, Keller, TX (US); Stephen Hilton Savoie, Arlington, TX (US)

( * ) Notice: Subject to any disclaimer, the term of this patent is extended or adjusted under 35 U.S.C. 154(b) by 0 days.

(21) Appl. No.: 18/215,043

(22) Filed: Jun. 27, 2023

Related U.S. Application Data

(60) Provisional application No. 63/436,007, filed on Dec. 29, 2022.

(51) Int. Cl.
*B44C 3/00* (2006.01)
*B44C 3/02* (2006.01)

(52) U.S. Cl.
CPC .................................... *B44C 3/00* (2013.01)

(58) Field of Classification Search
CPC .............. B44C 3/00; B44C 3/02; B44C 3/025
See application file for complete search history.

(56) References Cited

FOREIGN PATENT DOCUMENTS

| | | | |
|---|---|---|---|
| JP | 2018000389 A | * | 1/2018 |
| KR | 102291855 B1 | * | 10/2019 |
| WO | WO-2023073427 A1 | * | 5/2023 |

* cited by examiner

*Primary Examiner* — Bayan Salone

(74) *Attorney, Agent, or Firm* — Richard Eldredge; Leavitt and Eldredge Law Firm

(57) ABSTRACT

A method of producing a decorative article using snap fasteners is disclosed. The Method includes selecting a desired sheet of flexible material and a desired substrate; cutting the sheet based on a predetermined template; securing a plurality of snap fasteners to the sheet and to the substrate; folding the cut sheet into a desired three-dimensional shape; securing the desired three-dimensional shaped sheet in place via the plurality of snap fasteners; and coupling the secured three-dimensional shaped sheet to the substrate via the plurality of snap fasteners.

6 Claims, 3 Drawing Sheets

METHOD OF PRODUCING DECORATIVE ARTICLES USING SNAP FASTENERS

CROSS REFERENCE TO RELATED APPLICATIONS

This application claims the benefit of U.S. Provisional Application No. 63/436,007, filed Dec. 29, 2022, of which is hereby incorporated by reference in its entirety.

BACKGROUND

1. Field of the Invention

The present invention relates generally to decorative articles such as decorative panels, and more specifically, to a method for producing decorative articles or panels by attaching folded flexible material to a substrate using snap fasteners.

2. Description of Related Art

Decorative articles, such as artistic arrangements of folded and otherwise arranged together decorative pieces of material, are well known in the art. Such arrangements can be used on various surfaces or as standalone products. One method of constructing such an arrangement is by attaching the pieces of material to a substrate, such as a board, to produce a decorative panel. In addition to aesthetic value, the three-dimensional patterned nature of such panels also lends itself to the functional purpose of acoustic attenuation within a space, such as a home or an office.

In current practice, to produce such decorative panels, the decorative pieces of material are handsewn to the substrate, requiring meticulously skilled labor that is slow and expensive. As a result, the production rate of such decorative panels is limited. Thus, it would be advantageous to have a method that is efficient and cost effective for attaching decorative pieces to substrates.

Accordingly, it is an object of the present invention to provide a method that addresses the limitations discussed above and enables high-volume production of decorative panels with aesthetic and acoustic value.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
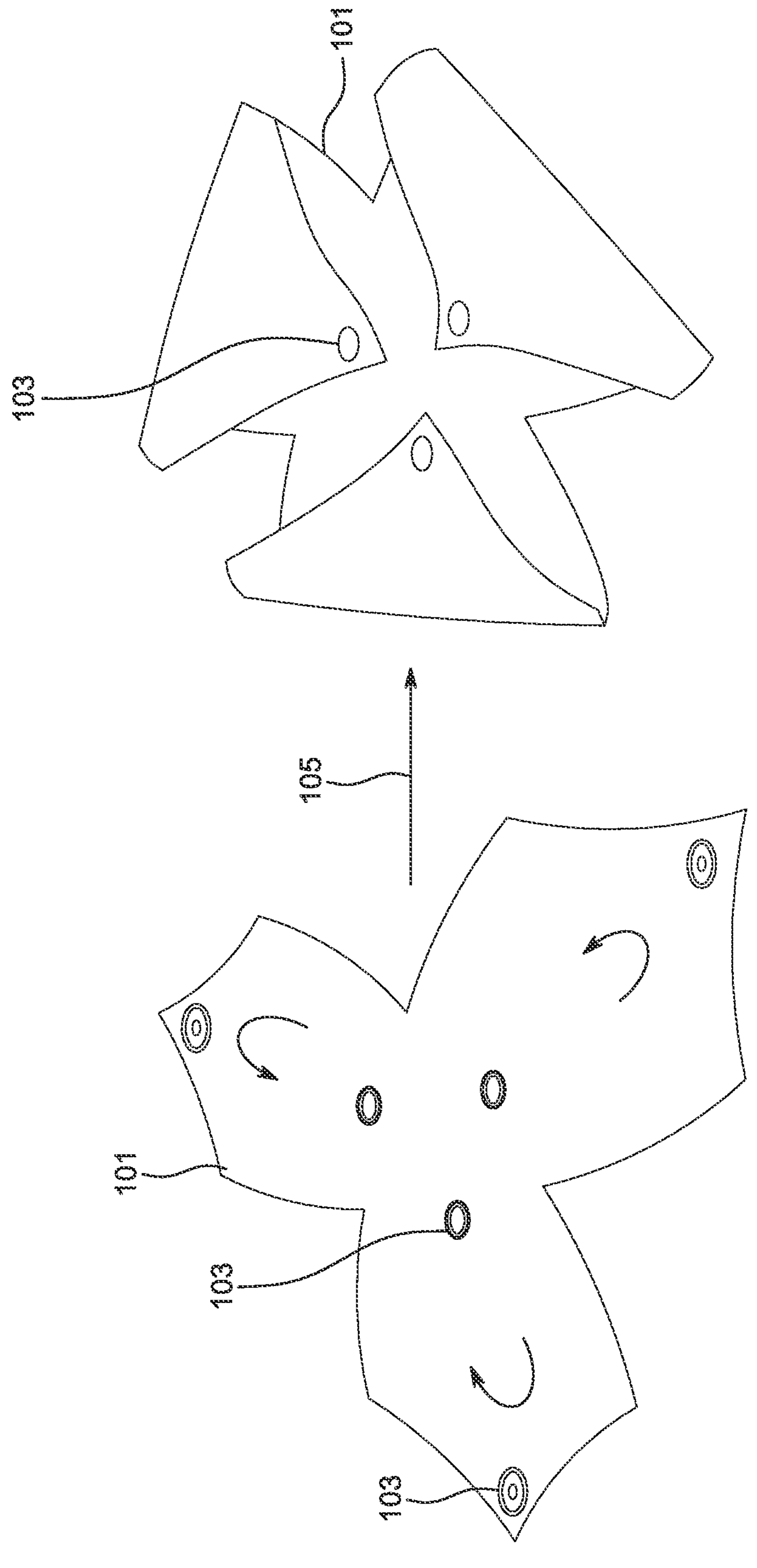
FIG. 1 is a plan view of folding a sheet of material in accordance with the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional methods of producing decorative panels. Specifically, the present invention provides a method of producing decorative articles efficiently and cost-effectively by attaching folded, flexible material to a substrate using snap fasteners. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIG. 1 depicts a plan view of folding a sheet of material 101 in accordance with the present application.

In the contemplated embodiment, the sheet 101 is formed from flexible material suitable to allow the sheet 101 to bend, twist, fold, or otherwise conform to a desired shape or configuration, as shown with directional arrows. The sheet 101 includes a plurality of snap fasteners 103 configured to secure the sheet 101 in a desired three-dimensional (3D) shape in place, as shown with directional arrow 105.

It should be understood that the sheet 101 is cut from a predetermined template such that the resulted cut sheet can be folded into a desired 3D shape. The sheet 101 may be produced through any suitable manufacturing method, such as, but not limited to die cutting. Examples of flexible material include, without limitation, felt, leather, cloth, thin plastic, wood veneer, thin sheet metal, or any other type of bendable or foldable material. It should be appreciated that the sheet 101 can be formed from any currently known or later developed flexible material.

Figure 2:
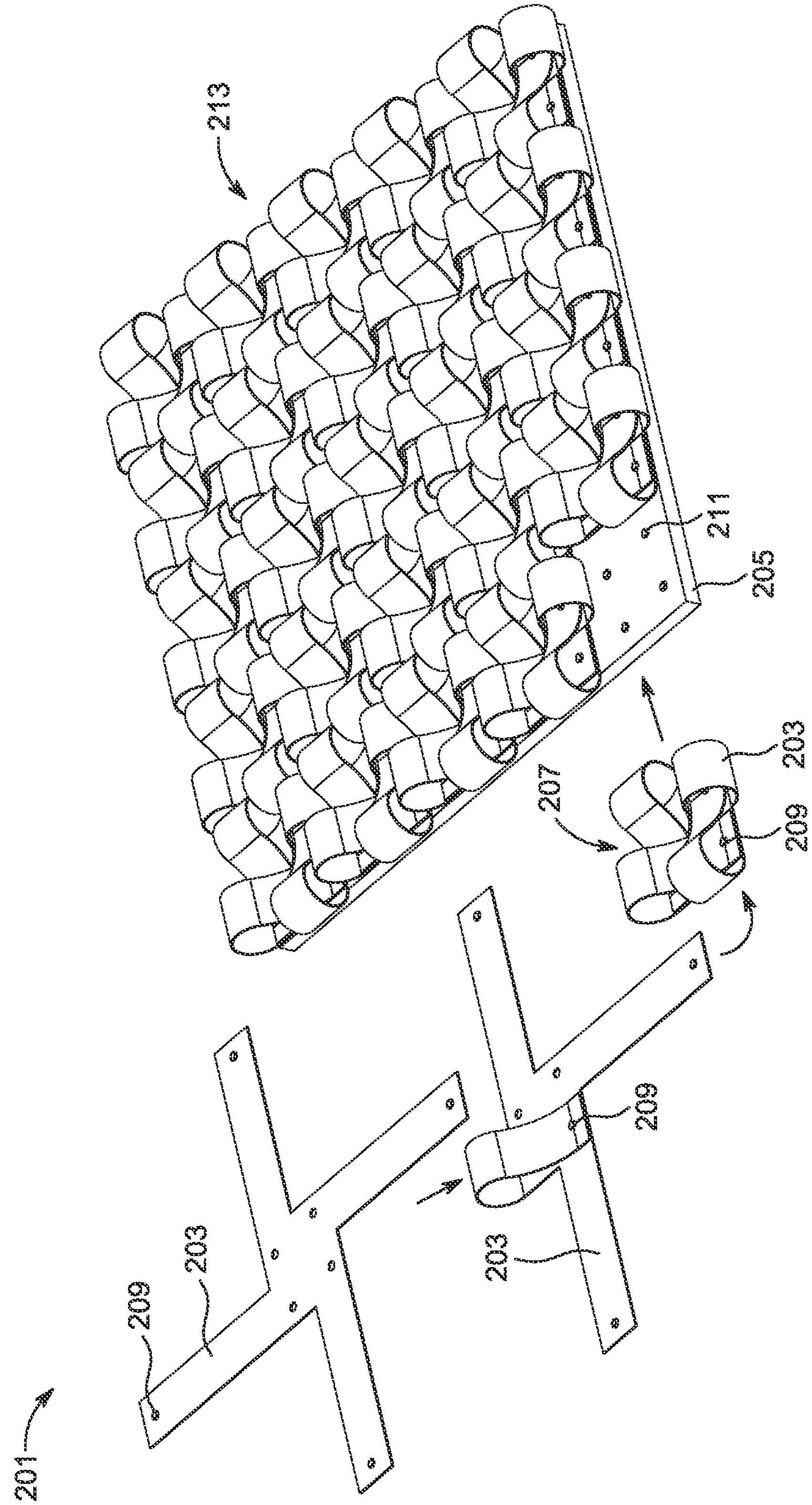
FIG. 2 is a plan view illustrating a flow for folding a sheet of material for placement on a substrate in accordance with the present application.

In FIG. 2, a plan view illustrating a flow 201 for producing patterns from a sheet 203 of material for placement on a substrate 205 is depicted in accordance with the present application. As shown, the sheet 203 is folded into a desired 3D shape 207, wherein the shape 207 is secured by a plurality of snap fasteners 209. The shape 207 is then secured to the substrate 205 with a plurality of snap fasteners 211. It should be understood that the snap fasteners 211 are complementary to snap fasteners 209. In some embodiments, the snap fasteners 211 are coupled to the substrate 205 through ultrasonic welding.

In some embodiments, the sheet 203 is folded and then secured to the substrate 205 with the snap fasteners 211, wherein the forementioned securement of the folded sheet 203 is what maintains the 3D shape 207.

It should be understood that multiple units of the folded sheet are secured to the substrate 205 to create a decorative article 213. The article 213 can be used for aesthetical purposes such as art décor, functional purposes such as acoustic sound dampening, or both.

It should be appreciated that one of the unique features believed characteristic of the present application is that it facilitates high volume production of unique, 3D shapes and patterns, thereby reducing labor and manufacturing costs.

Figure 3:
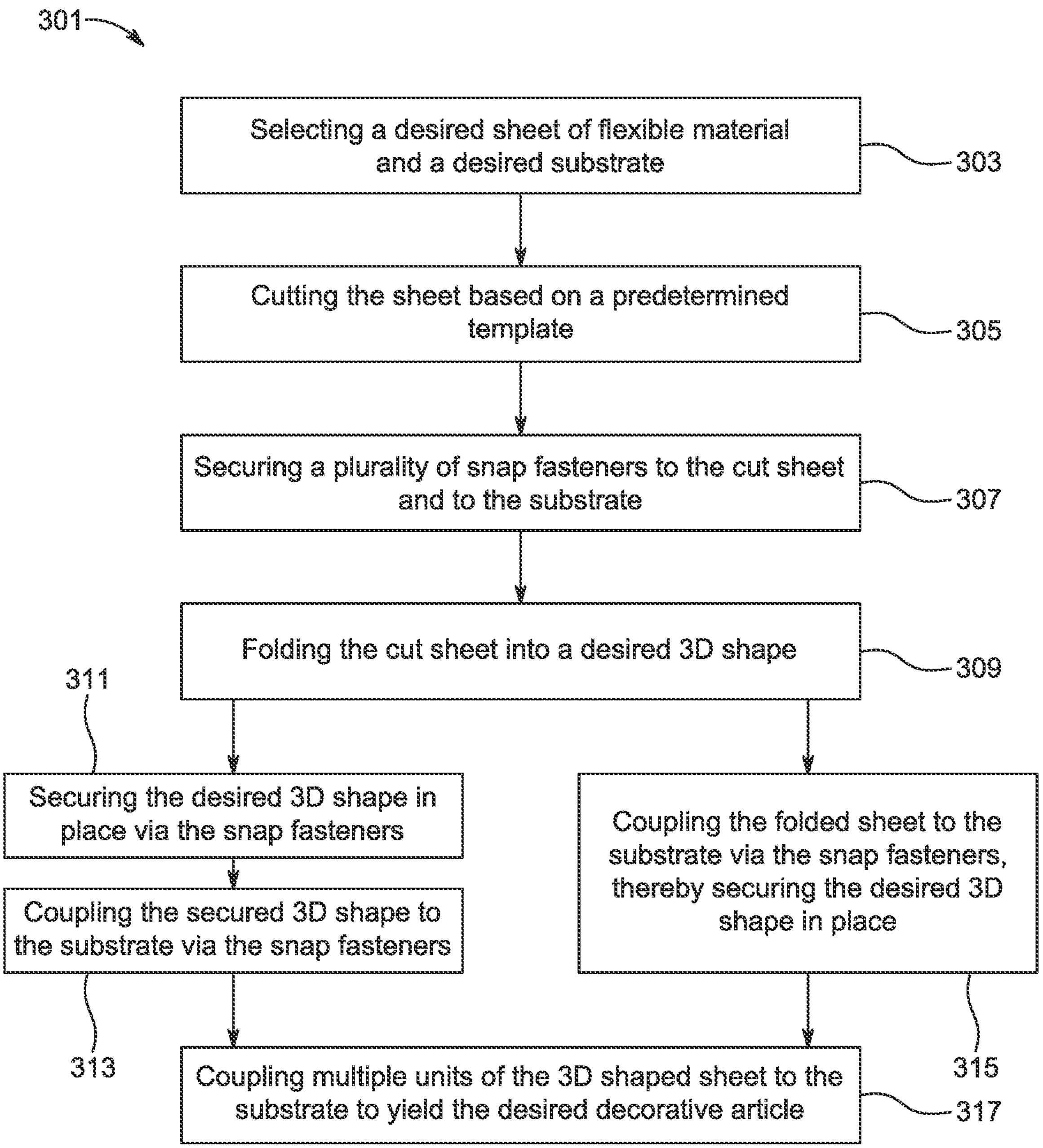
FIG. 3 is a flowchart of a method of producing a decorative article in accordance with the present application.

In FIG. 3, a flowchart 301 depicts a method of producing an article in accordance with the present application. First, a desired sheet of flexible material and a desired substrate are selected, as shown with box 303. The sheet is then cut from a predetermined template, as shown with box 305. Next, a plurality of snap fasteners is secured to the sheet and the substrate, as shown with box 307. It should be appreciated that the snap fasteners can be secured to the sheet and the substrate prior to cutting the sheet from the predetermined template.

In some embodiments, the sheet is folded into a desired 3D shape which is secured in place via the snap fasteners, as shown with boxes 309, 311. The sheet is then coupled to the substrate via the fasteners, as shown with box 313.

In other embodiments, the sheet is folded into a desired 3D shape and then coupled to the substrate via the snap fasteners, thereby securing the desired 3D shape in place, as shown with boxes 309, 313.

Additional 3D shaped sheets can be coupled to the substrate to yield the desired article, as shown with box 317.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A method of producing an article, the method comprising:

selecting a desired sheet of flexible material and a desired substrate;

cutting the sheet based on a predetermined template;

securing a plurality of snap fasteners to the cut sheet and to the substrate;

folding the cut sheet into a desired three-dimensional shape;

securing the desired three-dimensional shape in place via the plurality of fasteners; and coupling the secured three-dimensional shape to the substrate via the plurality of fasteners;

wherein the predetermine template allows the cut sheet to be folded into the desired three-dimensional shape;

wherein the substrate includes multiple units of the three-dimensional shaped sheet coupled thereto to yield the article.

2. The method of claim 1, wherein the flexible material is selected from a group including felt, leather, cloth, plastic, wood veneer, and sheet metal.

3. The method of claim 1, wherein the plurality of snap fasteners is secured to the substrate via ultrasonic welding.

4. A method of producing an article having, the method comprising:

selecting a desired sheet of flexible material and a desired substrate;

cutting the sheet based on a predetermined template;

securing a plurality of fasteners to the sheet and to the substrate;

folding the cut sheet into a desired three-dimensional shape; and coupling the folded cut sheet to the substrate via a plurality of snap fasteners, thereby securing the desired three-dimensional shape in place;

wherein the predetermine template allows the cut sheet to be folded into the desired three-dimensional shape; and wherein the substrate includes multiple units of the three-dimensional shaped sheet coupled thereto to yield the article.

5. The method of claim 4, wherein the flexible material is selected from a group including felt, leather, cloth, plastic, wood veneer, and sheet metal.

6. The method of claim 4, wherein the plurality of snap fasteners is secured to the substrate via ultrasonic welding.

* * * * *